United States Patent [19]
Toide

[11] Patent Number: 5,130,850
[45] Date of Patent: Jul. 14, 1992

[54] PROJECTION LENS SYSTEM

[75] Inventor: Eiichi Toide, Nagaokakyo, Japan

[73] Assignee: Mitsubishi Denki Kabushiki Kaisha, Tokyo, Japan

[21] Appl. No.: 627,190

[22] Filed: Dec. 13, 1990

[30] Foreign Application Priority Data

Dec. 20, 1989 [JP] Japan ................................ 1-331944
Feb. 23, 1990 [JP] Japan ................................ 2-43632

[51] Int. Cl.$^5$ .......................... G02B 13/18; G02B 9/64
[52] U.S. Cl. ................................. 359/649; 359/708
[58] Field of Search .................... 350/412, 432–435; 359/649, 708

[56] References Cited

U.S. PATENT DOCUMENTS

4,300,817 11/1981 Betensky ............................ 350/412
4,767,199 8/1988 Yamamoto et al. ............... 350/412
4,776,681 10/1988 Moskovich ......................... 350/432

Primary Examiner—Scott J. Sugarman

[57] ABSTRACT

A projection lens system for use in a projection type display and for displaying an image formed on a face plate of a cathode ray tube on a screen. The projection lens system includes of eight lens components disposed at the optical axis. The second and seventh lenses from the image side, among the eight lens components essentially have somewhat weak optical power, and are made up of a plastic lens having aspheric surfaces on both sides.

12 Claims, 6 Drawing Sheets

PROJECTION LENS SYSTEM

BACKGROUND OF THE INVENTION

1. Field of the Invention

This invention relates to a projection lens system for use in a projection type display and for displaying on a screen an image formed on a face plate of a cathode ray tube (hereinafter referred to as CRT).

2. Description of the Related Arts

Recent years have seen the increase in the use of a projection type display capable of projecting a TV image in a large screen size. For such a projection display, although several systems have been adopted, a system for projecting an image, which has been formed on a CRT on a screen, through a series of projection lenses is most widely utilized among others.

In respect of the projection lenses, there has been a demand for a lens having a wider field angle in order to reduce the size of the display cabinet as small as possible.

As another demand, the projection lens is expected to have a smaller F-number to secure a sufficient brightness of the image on a screen.

Projection lenses disclosed in U.S. Pat. Nos. 4,300,817 and 4,776,681 can be enumerated as the conventional types of projection lens. The type disclosed in U.S. Pat. No. 4,300,817 comprises three lens groups, while the type disclosed in U.S. Pat. No. 4,776,681 consists of five lens groups.

Further, as the typical projection lens, there have been a projection lens composed of ten lenses or more and a projection lens unit, a partial lens group thereof is formed in aspherical shape and the rest thereof are made up of plastic.

Thus, various types of conventional projection lenses have widely been used.

However, in the projection type display apparatus for displaying an image in large screen size or a high definition TV, a development of which is now proceeding, the above-described projection lens cannot always provide an image meeting the aforementioned requirements.

With the conventional projection lens, for example, a picture distortion occurs at the corner of the image projected on the screen and the volume of the projector itself disadvantageously becomes large because of the small field angle of the lens.

Accordingly, there has been expected a projection lens which is capable of obtaining an appropriate MTF (modulation transfer function) from the center to the corner of the image on the screen as well as one which is free from the aforementioned drawbacks.

The present invention aims to solve the above-mentioned problems with the conventional devices. One object of the present invention is to provide a projection lens capable of properly correcting aberrations from the center to the periphery of the image having a sufficient F number and a satisfiable field angle.

SUMMARY OF THE INVENTION

To achieve this aim, according to one aspect of the present invention, there is provided a projection lens system including eight lens components which are disposed at the optical axis, the lens components from the image end of the lens system comprise: a first lens component having a positive power, and including of a lens in the form of meniscus; a second lens group having a somewhat weak positive power in total, and consisting of an element in the form of meniscus overall having at least one aspheric surface; a third lens group having a negative power, and consisting of an element in the form of meniscus, for example; a fourth lens group having a positive power, and consisting of an element in the form of bi-convex; a fifth lens group disposed in contact with the convex image-side surface of the fourth lens group, consisting of an element in the form of meniscus, for example, and having a negative power; a sixth lens group having a positive power, and consisting of an element in the form of bi-convex; a seventh lens group having a positive power, and consisting of an element in the form of meniscus overall having at least one aspheric surface; and an eighth lens group having a negative power, and consisting of an element in the form of concave.

The operation of the projection lens system having the above-described structure is explained hereafter.

The first and second lens groups primarily serve to correct a spherical aberration and a coma aberration with high accuracy;

The third lens group chiefly serves to correct the spherical aberration and adjusts the balance among the lens groups with respect to the aberration correction;

The fourth lens group serves to converge the majority light of the projection lens system;

The fifth lens group primarily serves to correct a chromatic aberration;

The sixth lens group serves to converge light in conjunction with the fourth lens group;

The seventh lens group serves to correct an astigmatism aberration, the distortion aberration and the coma aberration with high accuracy; and The eighth lens group serves as a field flattener and to correct a field curvature and the astigmatism aberration.

The invention, however, both as to its construction and operation, together with further objects and advantages thereof may best be appreciated by reference to the following detailed description taken in conjunction with the accompanying drawings.

DETAILED DESCRIPTION OF THE INVENTION

Preferred embodiments of the present invention will now be described hereinbelow with reference to the accompanying drawings.

The embodiments of the present invention comprises six embodiments as will be explained hereafter, and a common structure through the projection lens systems of all embodiments if firstly explained.

Figure 1:
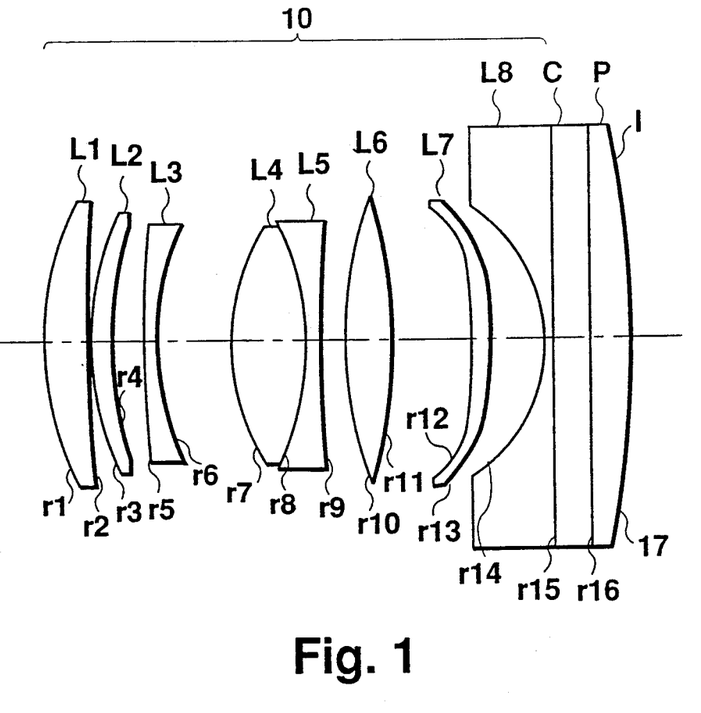
FIG. 1 is an explanatory view showing a structure of a projection lens system according to a first embodiment of the present invention.

For instance, as shown in FIG. 1, the projection lens system according to the present invention is composed of eight lens components. Each lens component of the lens system, i.e., L1 to L8, is disposed at the optical axis.

In such a projection lens system, a lens disposed at the foremost image end of the lens system is the first lens component L1 and a lens disposed at the object end of the lens system is the eighth lens component L8. Here, each lens component consists of a single element.

The projection lens system having the above set forth structure is disposed adjacent to a face plate P of the CRT, and more specifically the eighth lens component is connected with the face plate P through a cooling liquid layer C interposed between the eighth lens component and the face plate P disposed in contact with the face plate P.

Specifically, a phosphor screen I (upon which fluorescent material layer to be bombarded by electron beams is formed) on the inner surface of the face plate P is fabricated in the convex form. More concretely, the phosphor screen has a large thickness at the center and has a lesser thickness at its margins. Such a structure, therefore, facilitates the convergence of the light emitted from the fluorescent material at the marginal portions into the projection lens system; namely, it improves the beam condensing ratio.

By the adoption of the face plate, the inner surface thereof is fabricated in convex form, the illumination ratio between the center and the corner of the surface of the face plate on the image side is 1 to 0.4.

The coolant layer C has a uniform thickness in its structure and the coolant inside thereof sequentially circulates to prevent the excessive heating of the face plate.

Now, each lens component will be described hereunder.

The first lens component L1 disposed at the image end of the lens system is a lens in the form of meniscus having a positive power. Specifically, the first lens component is arranged in such a manner that the convex surface thereof faces towards the screen side.

The second lens component L2 essentially has a relatively weak power in total and consists of a lens in the form of an overall meniscus. This second lens L2 is fabricated to have aspheric surfaces on both sides throughout the embodiments. Moreover, the lens L2 is made up of material, such as plastic, in view of processing easiness.

Although the lens L2 has aspheric surfaces throughout the embodiments, the lens L2 has no inflection point and has an advantage that the lens can be processed with high precision.

The third lens component L3 is a lens having a weak negative power. In the embodiments, a lens in the form of a meniscus, a plano-concave lens and bi-concave lens are used for the lens L3.

The fourth lens component L4 is a bi-convex lens having a strong positive power, and serves as a primary light condensing lens in the overall projection lens system.

The fifth lens component L5 is a lens disposed in contact with the convex CRT-side surface of the fourth lens component and has a negative power. In the embodiments, a bi-concave lens or a meniscus lens is adopted for the fifth lens component L5.

The sixth lens component L6 is a bi-convex lens having a strong positive power and serves as an auxiliary light converging means together with the fourth lens component L4.

The seventh lens component L7 is a lens having aspheric surfaces on both sides and is in the form of an overall meniscus, and has a somewhat weak positive power. This seventh lens component L7 is also made up of plastic in light of processing easiness.

The eighth lens component is a lens disposed in contact with the above-stated coolant layer C, and consists of a plano-concave lens having a strong negative power. Specifically, the plano side of the lens L8 is arranged in contact with the coolant layer C.

The operation of each lens component disposed in the above-mentioned manner will be explained hereunder.

The first lens component L1 and the second lens component L2 primarily serve to correct the spherical aberration and the coma aberration, and performs a weak light converging action.

The third lens component L3 corrects the spherical aberration and performs a weak light dispersing action. Further, this third lens L3 adjusts the balance among the lens groups with respect to the aberration correction.

The fourth lens component L4 and the sixth lens component L6 primarily serve to effect a majory converging operation of light in the overall projection lens system.

The fifth lens component L5 being disposed in contact with the CRT-side lens surface of the fourth lens component L4 serves to correct the chromatic aberration.

The seventh lens component L7 primarily corrects the astigmatism aberration, the distortion aberration and the coma aberration with high accuracy. In order to perform the aberration correction with high accuracy, the both surfaces of the seventh lens are fabricated in the form of aspheric.

The eight lens component L8 is a field flattener, and corrects the astigmatism aberration as well as the field curvature.

Here, the second lens component L2 and the seventh lens component L7 are made up of a plastic lens. Since they have very little power, it is possible to secure a relatively large positional tolerance and suppress a defocus due to thermal variations to such a degree so as not to cause any disadvantage in practical use.

Elements of each projection lens in the embodiments are described in the following tables from Table 1 to Table 6. In the table, each table number corresponds to the numeral of each embodiment. In other words, the first embodiment is represented in the table 1, while the sixth embodiment is described in the table 6, likewise.

TABLE 1

| | | f = 123.672 (mm) | | Fno = 1.19 | $\beta = -0.0986$ | $\omega = 28°$ | |
|---|---|---|---|---|---|---|---|
| Lens | | r(mm) | | d(mm) | N ($\lambda$ = 543 nm) | $\nu d$ | f/fx (x = 1, ..., 8) |
| L1 | r1 | 109.676 | d1 | 16.723 | 1.591617 | 61.3 | 0.5695 |
| | r2 | 714.714 | d12 | 1.178 | | | |
| L2 | r3 | 135.366 | d2 | 6.886 | 1.494250 | 55.4 | 0.0698 |
| | r4 | 157.101 | d23 | 14.750 | | | |
| L3 | r5 | 871.659 | d3 | 3.935 | 1.624421 | 36.3 | −0.6039 |
| | r6 | 111.140 | d34 | 25.758 | | | |
| L4 | r7 | 96.040 | d4 | 29.792 | 1.591617 | 61.3 | 1.3658 |
| L5(L4) | r8 | −106.716 | d5 | 3.935 | 1.624428 | 36.3 | −0.8975 |
| | r9 | 446.034 | d56 | 9.322 | | | |
| L6 | r10 | 160.126 | d6 | 16.723 | 1.591617 | 61.3 | 0.7741 |
| | r11 | −220.675 | d67 | 27.516 | | | |
| L7 | r12 | −606.353 | d7 | 8.263 | 1.494250 | 55.4 | 0.1720 |
| | r13 | −224.811 | d78 | 19.000 | | | |
| L8 | r14 | −63.298 | d8 | 3.450 | 1.624428 | 36.3 | −1.2174 |
| C | r15 | inf. | dc | 14.100 | 1.401958 | 47.6 | |
| P | r16 | inf. | dp | 14.500 | 1.539800 | 57.3 | |
| I | r17 | −550.000 | | | | | |

| d23/f = 0.119 | d34/d23 = 1.746 | $f/f_{4+5}$ = 0.5764 |
|---|---|---|

| | | Aspheric Surfaces | | |
|---|---|---|---|---|
| | r3 | r4 | r12 | r13 |
| k | 1.68971 | 1.98054 | 44.5645 | −12.7959 |
| a4 | .574158E-07 | .281909E-06 | −.885467E-06 | −.728152E-06 |
| a6 | .590563E-10 | .924649E-10 | −.330435E-09 | −.343266E-09 |
| a8 | .108640E-13 | .225813E-13 | .167375E-13 | .340509E-13 |
| a10 | −.593097E-17 | −.7299343-17 | −114804E-16 | −.939072E-17 |

TABLE 2

| | | f = 158.193 (mm) | | Fno = 1.17 | $\beta = -0.0510$ | $\omega = 23°$ | |
|---|---|---|---|---|---|---|---|
| Lens | | r(mm) | | d(mm) | N ($\lambda$ = 543 nm) | $\nu d$ | f/fx |
| L1 | r1 | 136.652 | d1 | 20.000 | 1.591617 | 61.3 | 0.5693 |
| | r2 | 765.560 | d12 | 1.380 | | | |
| L2 | r3 | 194.128 | d2 | 8.080 | 1.494250 | 55.4 | 0.0931 |
| | r4 | 249.007 | d23 | 22.116 | | | |
| L3 | r5 | inf | d3 | 4.620 | 1.624421 | 36.3 | −0.6337 |
| | r6 | 155.870 | d34 | 36.538 | | | |
| L4 | r7 | 117.025 | d4 | 32.706 | 1.591617 | 61.3 | 1.5768 |
| L5(L4) | r8 | −107.930 | d5 | 4.620 | 1.624428 | 36.3 | −0.8985 |
| | r9 | −6000.000 | d56 | 16.603 | | | |
| L6 | r10 | 204.429 | d6 | 16.790 | 1.591617 | 61.3 | 0.5689 |
| | r11 | −816.620 | d67 | 45.087 | | | |
| L7 | r12 | 3033.538 | d7 | 8.260 | 1.494250 | 55.4 | 0.2855 |
| | r13 | −300.742 | d78 | 11.000 | | | |
| L8 | r14 | −75.000 | d8 | 3.700 | 1.624428 | 36.3 | −1.3171 |
| C | r15 | inf | dc | 14.500 | 1.401958 | 47.6 | |
| P | r16 | inf | dp | 14.500 | 1.539800 | 57.3 | |
| I | r17 | −550.000 | | | | | |

| d23/f = 0.1398 | d34/d23 = 1.652 | $f/f_{4+5}$ = 0.7712 |
|---|---|---|

| | | Aspheric Surfaces | | |
|---|---|---|---|---|
| | r3 | r4 | r12 | r13 |
| k | 2.350400 | 1.404571 | −3.887842 | −28.119538 |
| a4 | .747775E-07 | .187837E-06 | −.634587E-06 | −.6447823-06 |
| a6 | .200363E-10 | .301928E-10 | −.287386E-09 | −.3408133-09 |
| a8 | .524934E-14 | .690566E-14 | .543357E-14 | .339848E-13 |
| a10 | −.908616E-18 | −.108239E-17 | −.969468E-17 | −.972607E-17 |

TABLE 3

| | | f = 123.672 (mm) | | Fno = 1.19 | $\beta = -0.0986$ | $\omega = 28°$ | |
|---|---|---|---|---|---|---|---|
| Lens | | r(mm) | | d(mm) | N ($\lambda$ = 543 nm) | $\nu d$ | f/fx |
| L1 | r1 | 130.856 | d1 | 16.723 | 1.591617 | 61.3 | 0.5075 |
| | r2 | 1350.186 | d12 | 1.178 | | | |
| L2 | r3 | 146.151 | d2 | 6.886 | 1.494250 | 55.4 | 0.0600 |
| | r4 | 167.972 | d23 | 23.744 | | | |
| L3 | r5 | −473.440 | d3 | 3.935 | 1.624421 | 36.3 | −0.5861 |

TABLE 3-continued

| | | f = 123.672 (mm) | | Fno = 1.19 | $\beta = -0.0986$ | $\omega = 28°$ | |
|---|---|---|---|---|---|---|---|
| | r6 | 183.152 | d34 | 23.530 | | | |
| L4 | r7 | 99.451 | d4 | 27.129 | 1.591617 | 61.3 | 1.4925 |
| L5(L4) | r8 | −86.885 | d5 | 3.935 | 1.624428 | 36.3 | −0.740 |
| | r9 | −528.180 | d56 | 13.681 | | | |
| L6 | r10 | 155.618 | d6 | 16.723 | 1.591617 | 61.3 | 0.5642 |
| | r11 | −747.491 | d67 | 32.286 | | | |
| L7 | r12 | −2156.200 | d7 | 8.263 | 1.494250 | 55.4 | 0.1655 |
| | r13 | −315.759 | d78 | 11.000 | | | |
| L8 | r14 | −63.802 | d8 | 3.640 | 1.624428 | 36.3 | −1.2104 |
| C | r15 | inf. | dc | 14.100 | 1.401958 | 47.6 | |
| P | r16 | inf. | dp | 14.500 | 1.539800 | 57.3 | |
| I | r17 | −550.000 | | | | | |

| d23/f = 0.192 | d34/d23 = 0.991 | $f/f_{4+5} = 0.8232$ |
|---|---|---|

Aspheric Surfaces

| | r3 | r4 | r12 | r13 |
|---|---|---|---|---|
| k | 2.026212 | 1.572280 | 50.000000 | 12.089039 |
| a4 | .915355E-07 | .268149E-06 | −.139937E-05 | −.972310E-06 |
| a6 | .565962E-10 | .103350E-9 | −.213299E-09 | −.278515E-09 |
| a8 | .166129E-13 | .15866E-13 | −.525607E-13 | −.474237E-14 |
| a10 | −.640858E-17 | −.602573E-17 | .317716E-17 | −.377278E-17 |

TABLE 4

| | | f = 123.752 (mm) | | Fno = 1.19 | $\beta = -0.0986$ | $\omega = 23°$ | |
|---|---|---|---|---|---|---|---|
| Lens | | r(mm) | | d(mm) | N ($\lambda$ = 543 nm) | $\nu d$ | f/fx |
| L1 | r1 | 127.384 | d1 | 16.723 | 1.591617 | 61.3 | 0.5057 |
| | r2 | 1008.508 | d12 | 1.178 | | | |
| L2 | r3 | 143.716 | d2 | 6.886 | 1.494250 | 55.4 | 0.0692 |
| | r4 | 168.892 | d23 | 23.745 | | | |
| L3 | r5 | −660.773 | d3 | 3.935 | 1.624421 | 36.3 | −0.5792 |
| | r6 | 167.559 | d34 | 23.629 | | | |
| L4 | r7 | 99.473 | d4 | 24.777 | 1.591617 | 61.3 | 1.5102 |
| L5(L4) | r8 | −85.814 | d5 | 3.935 | 1.624428 | 36.3 | −0.7510 |
| | r9 | −526.150 | d56 | 13.681 | | | |
| L6 | r10 | 168.080 | d6 | 16.723 | 1.591617 | 61.3 | 0.5457 |
| | r11 | −640.640 | d67 | 32.413 | | | |
| L7 | r12 | −1111.572 | d7 | 8.263 | 1.494250 | 55.4 | 0.1991 |
| | r13 | −241.327 | d78 | 11.000 | | | |
| L8 | r14 | −62.557 | d8 | 3.675 | 1.624428 | 36.3 | −1.2353 |
| C | r15 | inf | dc | 14.100 | 1.401958 | 47.6 | |
| P | r16 | inf | dp | 14.500 | 1.539800 | 57.3 | |
| I | r17 | −550.000 | | | | | |

| d23/f = 0.192 | d34/d23 = 0.995 | $f/f_{4+5} = 0.8244$ |
|---|---|---|

Aspheric Surfaces

| | r3 | r4 | r12 | r13 |
|---|---|---|---|---|
| k | 1.952598 | 1.597137 | 50.000000 | 9.401122 |
| a4 | .84008E-07 | .270261E-06 | −.127726E-05 | −.842220E-06 |
| a6 | .572336E-10 | .102673E-09 | −.177772E-09 | −.261192E-09 |
| a8 | .157689E-13 | .157375E-13 | −.552341E-13 | −.273900E-14 |
| a10 | −.697782E-17 | −.720617E-17 | .175825E-17 | −.569991E-17 |

TABLE 5

| | | f = 158.212 (mm) | | Fno = 1.17 | $\beta = -0.0510$ | $\omega = 23°$ | |
|---|---|---|---|---|---|---|---|
| Lens | | r(mm) | | d(mm) | N ($\lambda$ = 543 nm) | $\nu d$ | f/fx |
| L1 | r1 | 134.434 | d1 | 20.000 | 1.591617 | 61.3 | 0.5594 |
| | r2 | 646.041 | d12 | 1.383 | | | |
| L2 | r3 | 190.461 | d2 | 8.084 | 1.494250 | 55.4 | 0.0723 |
| | r4 | 227.923 | d23 | 27.875 | | | |
| L3 | r5 | 1970.836 | d3 | 4.619 | 1.624421 | 36.3 | −0.5831 |
| | r6 | 155.864 | d34 | 37.904 | | | |
| L4 | r7 | 113.496 | d4 | 30.000 | 1.591617 | 61.3 | 1.5776 |
| L5(L4) | r8 | −112.110 | d5 | 4.619 | 1.624428 | 36.3 | −0.8296 |
| | r9 | −1945.072 | d56 | 14.975 | | | |
| L6 | r10 | 214.008 | d6 | 16.786 | 1.591617 | 61.3 | 0.5201 |
| | r11 | −1098.686 | d67 | 42.167 | | | |
| L7 | r12 | −2011.495 | d7 | 8.263 | 1.494250 | 55.4 | 0.2451 |
| | r13 | −275.753 | d78 | 11.000 | | | |
| L8 | r14 | −75.000 | d8 | 3.660 | 1.624428 | 36.3 | −1.3173 |
| C | r15 | inf | dc | 14.500 | 1.401958 | 47.6 | |
| P | r16 | inf | dp | 14.500 | 1.539800 | 57.3 | |

TABLE 5-continued

| f = 158.212 (mm) | Fno = 1.17 | β = −0.0510 | ω = 23° |
|---|---|---|---|
| I r17 −550.000 | | | |

| d23/f = 0.176 | d34/d23 = 1.360 | f/f$_{4+5}$ = 0.8281 |
|---|---|---|

| Aspheric Surfaces | | | |
|---|---|---|---|
| | r3 | r4 | r12 | r13 |
| k | 2.483434 | 2.097083 | 11.814432 | −35.619087 |
| a4 | .872496E-07 | .202258E-06 | −.672432E-06 | −.764418E-06 |
| a6 | .178884E-10 | .282199E-10 | −.315628E-09 | −.352568E-09 |
| a8 | .466804E-14 | .669694E-14 | .147672E-13 | .408794E-13 |
| a10 | −.108017E-17 | −.136763E-17 | −.824551E-17 | −.829197E-17 |

TABLE 6

| f = 154.085 (mm) | Fno = 1.17 | β = −0.0502 | ω = 23° |
|---|---|---|---|

| Lens | | r(mm) | | d(mm) | N (λ = 543 nm) | νd | f/fx |
|---|---|---|---|---|---|---|---|
| L1 | r1 | 146.916 | d1 | 20.000 | 1.591617 | 61.3 | 0.5377 |
| | r2 | 1044.694 | d12 | 1.383 | | | |
| L2 | r3 | 169.709 | d2 | 8.084 | 1.494250 | 55.4 | 0.0660 |
| | r4 | 195.844 | d23 | 27.875 | | | |
| L3 | r5 | 4162.710 | d3 | 4.619 | 1.624421 | 36.3 | −0.5763 |
| | r6 | 160.444 | d34 | 37.437 | | | |
| L4 | r7 | 111.953 | d4 | 30.000 | 1.591617 | 61.3 | 1.5723 |
| L5(L4) | r8 | −108.288 | d5 | 4.619 | 1.624428 | 36.3 | −0.8435 |
| | r9 | −2172.475 | d56 | 15.243 | | | |
| L6 | r10 | 224.015 | d6 | 18.384 | 1.591617 | 61.3 | 0.5691 |
| | r11 | −545.033 | d67 | 40.750 | | | |
| L7 | r12 | 15810.384 | d7 | 8.263 | 1.494250 | 55.4 | 0.2324 |
| | r13 | −334.607 | d78 | 11.000 | | | |
| L8 | r14 | −75.000 | d8 | 3.800 | 1.624428 | 36.3 | −1.2829 |
| C | r15 | inf | dc | 14.100 | 1.401958 | 47.6 | |
| P | r16 | inf | dp | 14.500 | 1.539800 | 57.3 | |
| I | r17 | −550.000 | | | | | |

| d23/f = 0.181 | d34/d23 = 1.343 | f/f$_{4+5}$ = 0.8115 |
|---|---|---|

| Aspheric Surfaces | | | |
|---|---|---|---|
| | r3 | r4 | r12 | r13 |
| k | 2.102844 | 1.558791 | −49.965910 | −41.281257 |
| a4 | .595756E-07 | .174913E-06 | −.983916E-06 | −.945896E-06 |
| a6 | .230942E-10 | .403681E-10 | −.166624E-09 | −.233153E-09 |
| a8 | .493011E-14 | .584889E-14 | −.274082E-13 | .125368E-13 |
| a10 | −.127769E-17 | −.137594E-17 | −.962109E-17 | −.948563E-17 |

Reference symbols in the tables will now be described. The symbol f (mm) depicts a focal length of the overall projection lens, or EFL (equivalent focal length); Fno, a F-number; β, a transverse magnification normal to the optical axis; ω (degree), a semi-field angle; γ (mm), a curvature; and d (mm), a distance between lens surfaces, or a thickness of each lens and a distance between lenses. For instance, d12 denotes the distance between the surfaces of the first lens component L1 and the second lens component L2. N is a refractive index of each lens component with respect to light having a wavelength of λ=543 nm and γd denotes the Abbe constant. The symbol $f_{4+5}$ is the refraction index in the state in which the fourth lens component L4 and the fifth lens component L5 are kept in contact with each other.

Further, k, a4, a6, a8, a10 are constants for defining the aspheric surface lately explained.

The aspheric surfaces of the second lens component L2 and the seventh lens component L7 are defined by the following equation:

$$X = c_6 \times p^2 / \{1 + (1-(1+k) \times c^2 \times p^2)^{\frac{1}{2}}\} + a4 \times p^4 + a6 \times p^6 + a8 \times p^8 + a10 \times p^{10}$$

wherein $p = (y^2 + z^2)^{\frac{1}{2}}$.

Here, x, y, z denote each coordinate of the rectangular coordinates in which the x axis represents the optical axis. The symbol c denotes a radius of curvature at the vertex of the lens surface; k, a, conic constant; and a4, a6, a8, a10, high-order coefficients with respect to p.

Consequently, a coordinate at each point on the lens surface can be defined by substituting each coefficient shownn in the tables for the foregoing aspheric equation. The aspheric surface is a symmetrical pattern of revolution at the optical axis (x axis)

First embodiment

FIG. 1 of the accompanying drawings is a schematic diagram showing the overall structure of a projection lens system 10 in accordance with the present invention. This lens system 10 has a structure on the basis of the numerical values listed in the perscription table 1. Each lens component L1 to L8 shown in FIG. 1 is composed of a single element. Alternatively, each lens component may be formed of a plurality of lens elements.

This projection lens system in accordance with the first embodiment is featured in that the fifth lens component L5 consists of a bi-concave lens. This fifth lens component, however, is composed of a meniscus lens in other embodiments. Further in this embodiment, the semi-field angle * is 28 degrees; Fno is 1.19; and a wide field and a sufficient aperture ratio are secured.

Figure 2:
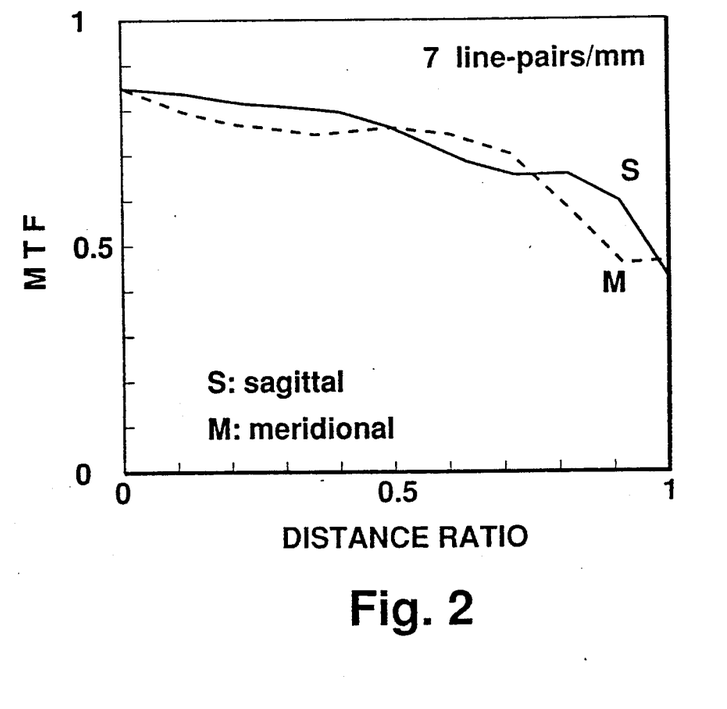
FIG. 2 is a characteristic diagram showing an MTF characteristic of the projection lens system according to the first embodiment.

FIG. 2 shows the MTF characteristic of the projection lens system 10 of the first embodiment.

The MTF characteristic is defined when a spatial frequency on a face panel surface of the CRT is 7 line-pairs/mm. Here, the longitudinal axis depicts the MTF, while the lateral axis does an off-axis distance ratio relative to the optical axis; namely, a ratio of a distance from the optical axis to the diagonal distance in the raster field having a size of 5.2 inches as deemed 1. More specifically, the location of the optical axis is 0, while the remotest location from the optical axis is 1.

In calculating the MTF, 1 is ued for a weighting coefficient to the light having a wavelength of $\lambda=621$ (nm), whereas 5 is used for the light having a wavelength of $\lambda=582$; 100 is used for the light having a wavelength of $\lambda=543$; and 30 is used for the light having a wavelength of $\lambda=688$.

As shown in FIG. 2, in accordance with the projection lens system 10 of the first embodiment, it is possible to achieve the MTF of 80% or more at the center of the screen. In addition, it is possible to secure the appropriate MTF to the extent of the outer periphery of the screen. In the same manner, a high MTF is realized in both sagittal S and meridional M directions.

Accordingly, it can be seen that the projection lens system 10 in accordance with the first embodiment enables to an appropriate aberration correction to be achieved to the extent of the periphery of the screen as well as to secure a wide field angle and a sufficient Fno.

Second embodiment

Figure 3:
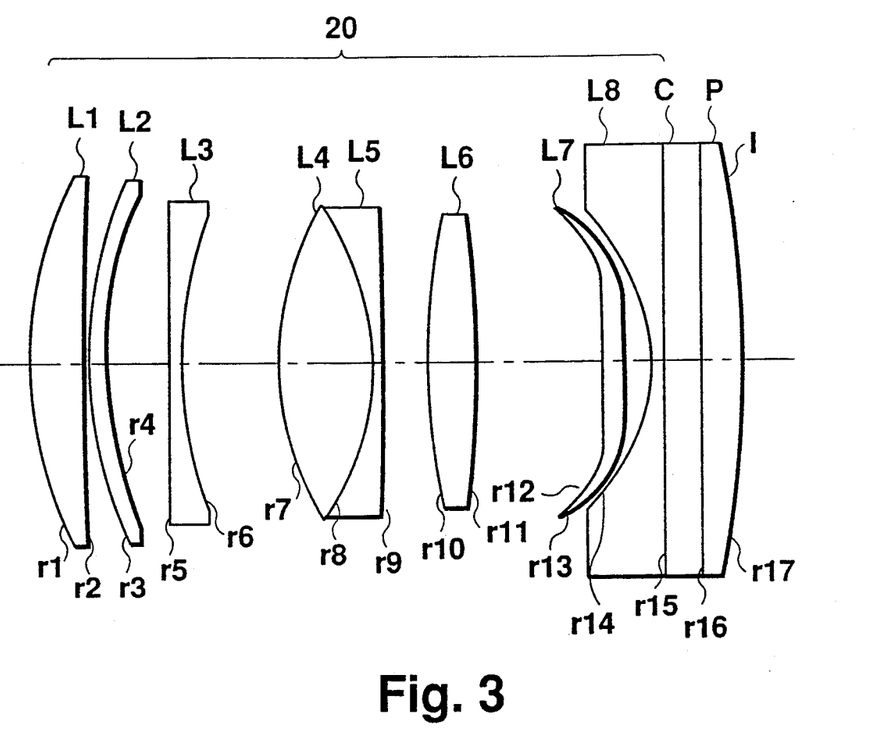
FIG. 3 is an explanatory view showing the structure of a projection lens system according to a second embodiment of the present invention.

FIG. 3 is a schematic diagram showing the overall structure of a projection lens system in accordance with a second embodiment of the present invention. This lens system has a configuration on the basis of the numerical values listed in the prescription tabel 2.

According to the second embodiment, the third lens component L3 consists of a plano-concave lens.

The projection lens system 20 in accordance with the second embodiment has the smaller semi-field angel of 23 degrees and Fno of 1.17 as compared with the first embodiment. As illustrated by the MTF characteristic of FIG. 4, in accordance with the second embodiment, it is possible to secure an extremely high MTF of 90% or more at the optic axis. Furthermore, an appropriate MTF can maintained even at the off-axis zone.

Figure 4:
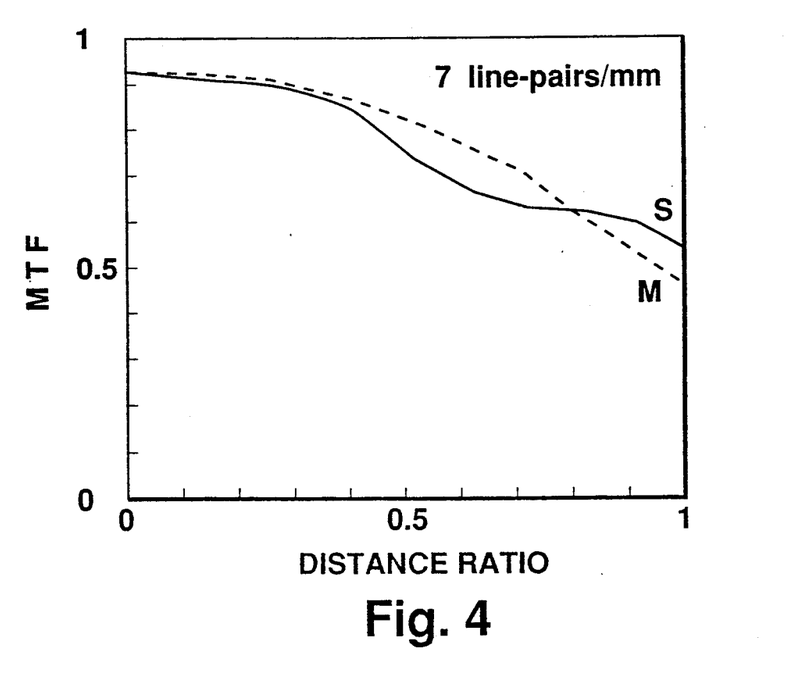
FIG. 4 is a characteristic diagram showing the MTF characteristic of the projection lens according to the second embodiment of the present invention.
Figure 5:
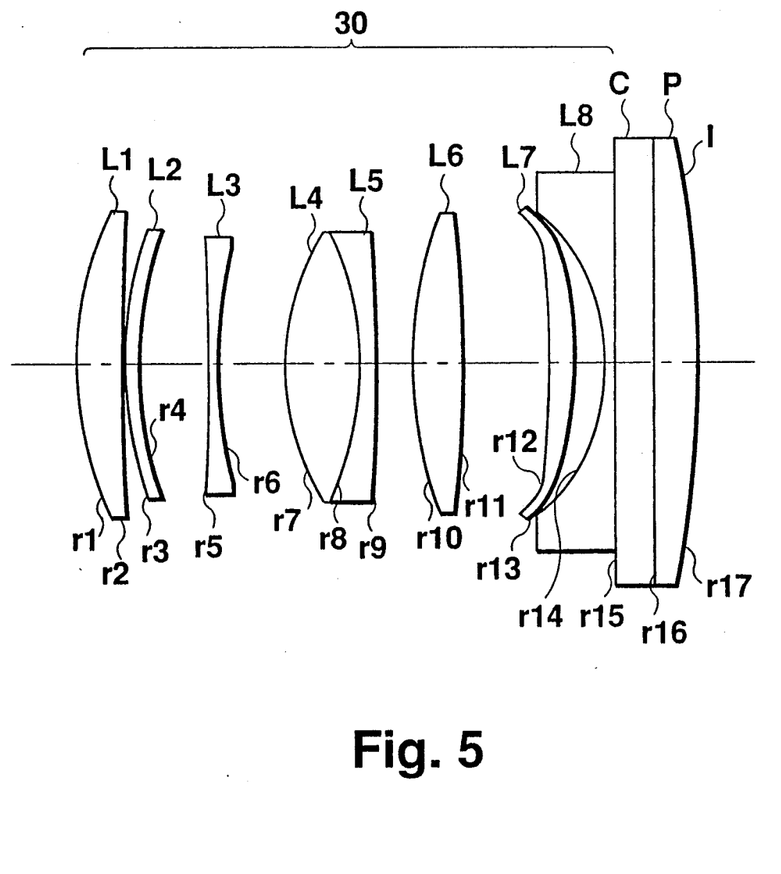
FIG. 5 is an explanatory view showing a structure of a projection lens system according to a third embodiment of the present invention.

As a result, even in the projection lens system 20 in accordance with the second embodiment, it can be understood that it is possible to secure an appropriate MTF over the entire area of the screenn and a sufficient aberration correction has been achieved in the screen.

Third embodiment

FIG. 3 schematically illustrates the overall structure of a projection lens system in accordance with a third embodiment of the present invention.

In this third embodiment, a bi-concave lens is used as the third lens component L3.

As illustrated in the table 3, the projection lens system in accordance with the third embodiment secures the semi-field angle of 28 degrees as wide as that of the projection lens system of the first embodiment and attains the Fno of 1.19.

Figure 6:
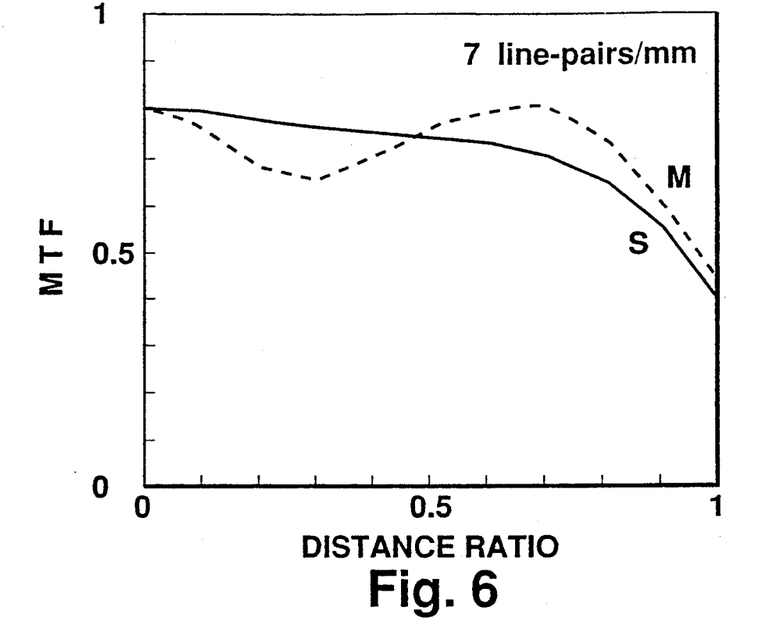
FIG. 6 is a characteristic diagram showing the MTF characteristic of the projection lens system according to the third embodiment of the present invention.

FIG. 6 illustrates the MTF characteristic of the projection lens in accordance with the third embodiment.

As can be seen from the MTF characteristics, even in accordance with this third embodiment, an appropriate MTF can be realized even to the extent of the of-axis zone.

Fourth embodiment

A fourth embodiment listed in the table 4 is an exemplary lens system obtained by making a minor modification to the lens system of the third embodiment. A schematic diagram of the fourth embodiment is omitted here because the structure thereof is highly similar to that of the lens system of the third embodiment.

In the projection lens system of the fourth embodiment, the semi-field angle $\omega$ is as wide as 28 degrees, and Fno of 1.19 is obtained.

Figure 7:
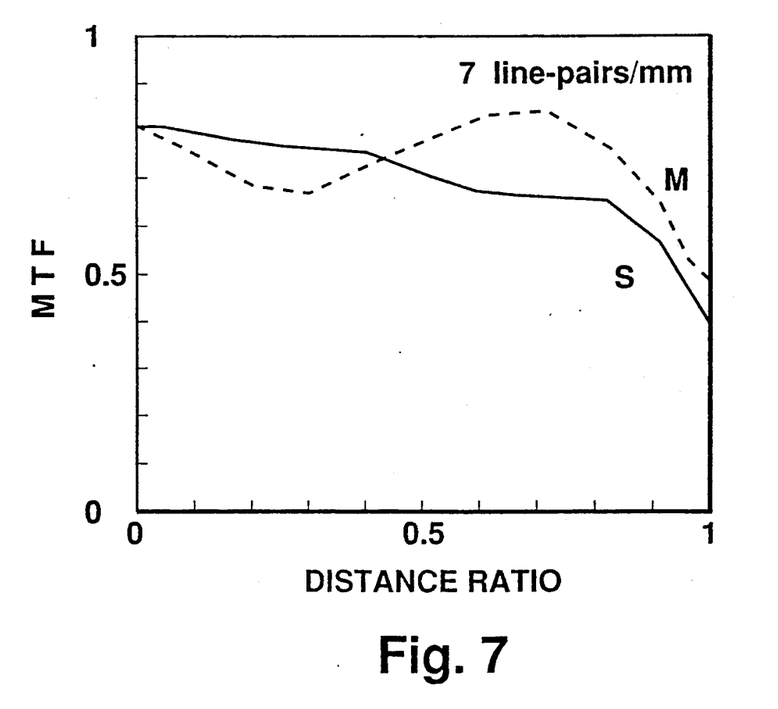
FIG. 7 is a characteristic diagram showing the MTF characteristic of the projection lens system according to a fourth embodiment of the present invention.

As shown in FIG. 7, there is obtained an MTF characteristic similar to that achieved by the third embodiment.

Fifth embodiment

Figure 8:
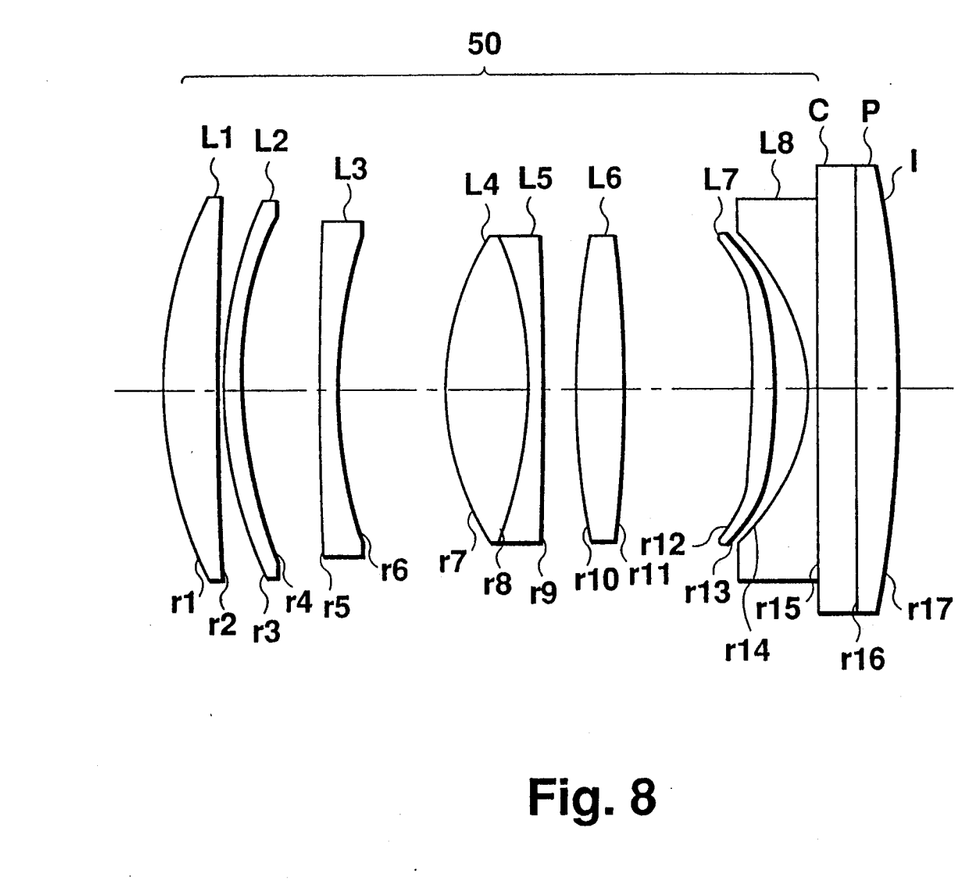
FIG. 8 is an explanatory view showing a structure of a projection lens system according to a fifth embodiment of the present invention.

FIG. 8 schematically illustrates the structure of the projection lens system 50 in accordance with a fifth embodiment.

In this fifth embodiment, like in the first embodiment, the third lens component L3 consists of the meniscus lens.

According to the third embodiment, there are achieved the Fno of 1.17 as well as the semi-field angle $\omega$ of 23 degrees, both of which are equivalent to those of the second embodiment.

Figure 9:
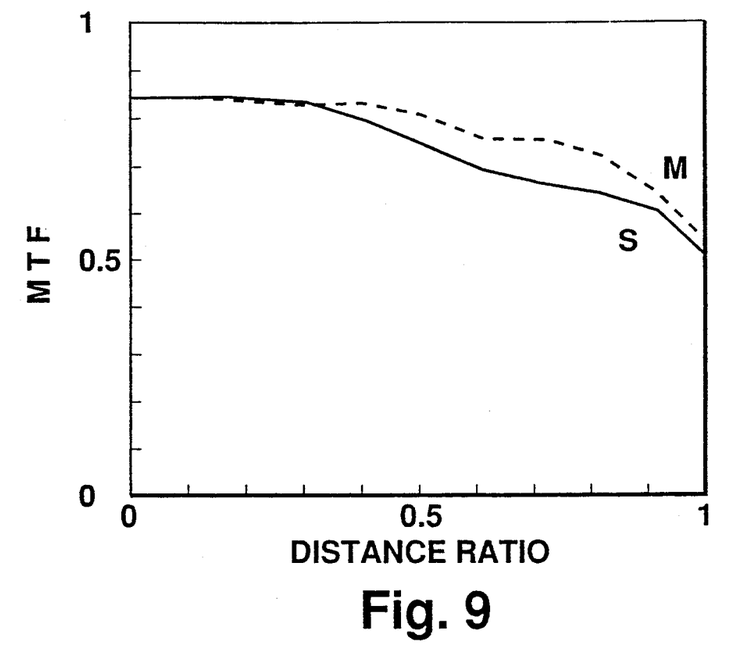
FIG. 9 is a characteristic diagram showing the MTF characteristic of the projection lens system according to the fifth embodiment of the present invention.

FIG. 9 shows the MTF characteristic of the projection lens system 50 of the fifth embodiment. In this fifth embodiment, the MTF characteristic at the periphery of the screen is particularly superior. In addition, the MTF at the optical axis also exhibits an appropriate value.

Sixth embodiment

A sixth embodiment described in the table 6 realizes the semi-field angle $\omega$ and the Fno equivalent of the fifth embodiment, and the schematic diagram thereof illustrating the structure is omitted here for its similarity to the fifth embodiment in structure.

Figure 10:
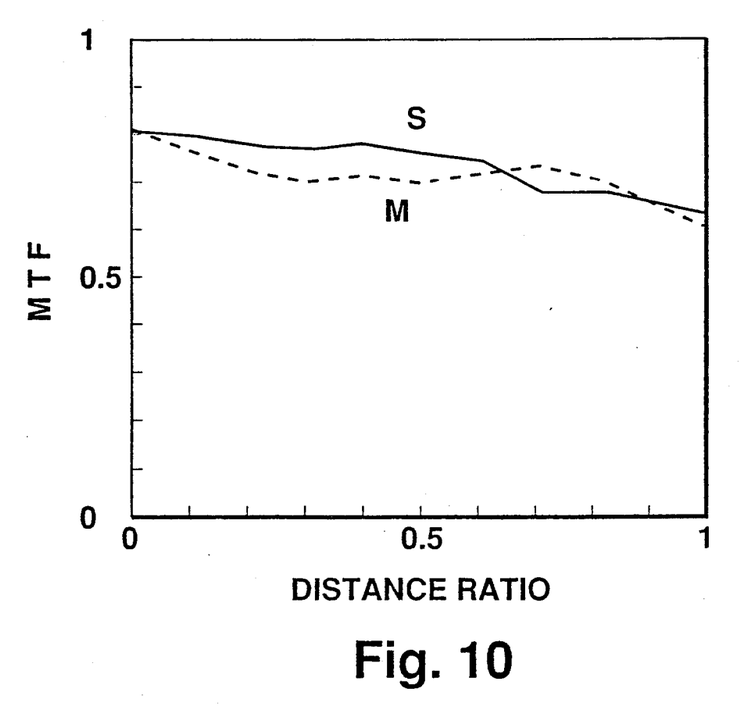
FIG. 10 is a characteristic diagram showing the MTF characteristic diagram of the projection lens system according to a sixth embodiment of the present invention.

In the sixth embodiment, as shown in FIG. 10, it is possible to secure an approximately constant MTF from the center at the optical axis to the off-axis zone.

Namely, according to the sixth embodiment, it will be appreciated that the aberration correction is particularly attained at the periphery of the screen.

Comprehensive features of the embodiments:

The comprehensive features of all the embodiments set forth are described hereinbelow.

First, each of the six embodiments set forth satisfy the following six relationships.

$$0.50 < f/f_1 < 0.60 \tag{1}$$

$$-0.65 < f/f_3 < -0.57 \tag{2}$$

$$0.55 < f/f_{4+5} < 0.85 \tag{3}$$

$$0.50 < f_6 < 0.80 \tag{4}$$

$$0.10 < d_{23}/f < 0.20 \tag{5}$$

$$0.90 < d_{34}/d_{23} < 1.8 \tag{6}$$

where the relational expression 1 denotes the relationship between f and $f_1$. When $f/f_1$ exceeds the upper limitation, it becomes impossible to achieve the correction of the coma aberration, whereas when the value is under the lower limitation, the length of the overall projection lens becomes disadvantageously long.

The expression 2 denotes the relationship between f and $f_3$. When the $f/f_3$ exceeds the upper limitation, the magnitude of sagittal flare becomes large, and it becomes impossible to attain the correction of the chromatic aberration. Meanwhile, when the value $f/f_3$ is below the lower limitation, it becomes hard to achieve the correction of the coma aberration.

The expression 3 denotes the relationship between f and $f_{4+5}$. When the value of $f/f_{4+5}$ exceeds the upper limitation, the correction of the coma aberration becomes difficult to be performed, while when the value is below the lower limitation, the correction of the coma aberration and the astigmatism aberration becomes disadvantageously difficult to be realized because of the necessity of increasing the power of the sixth lens component L6.

The expression 4 represents the range of the focal length $f_6$ of the sixth lens component. When the value exceeds the upper limitation, the correction of the coma aberration and the astigmatism aberration are difficult to be realized. In the meantime, when the value is below the lower limitation, it becomes difficult to attain the correction of the coma aberration for the necessity of increasing the power of the fourth lens L4 and fifth lens L5 component.

The expression 5 shows the relationship between $d_{23}$, that is, an axial spacing between the surfaces of the second L2 and the third component L3, and the focal length f. In this relationship, when $d_{23}/f$ exceeds the upper limitation, the correction of the coma aberration becomes difficult to be achieved, whereas when the value is below the lower limitation, the correction of the astigmatism becomes difficult to be realized.

Still, the expression 6 shows the relationship between the axial spacing $d_{34}$, between the surfaces of the third L3 and the fourth component L4, and the axial distance $d_{23}$, between the lens surfaces of the second L2 and the third lens component L3. When $d_{34}/d_{23}$ exceeds the upper limitation, the chromatic aberration may readily occur. On the other hand, when the value is below the lower limitation, the sagittal flare may disadvantageously occur. In general, if the value exceeds the range of each expression set forth, it is necessary to increase the degree of aspherical surface of the second lens L2 and the seventh lens component L7, resulting in the difficulty of manufacturing the lens system.

Each embodiment set forth in accordance with the present invention satisfies all of the six relationships, and in consequence, the drawbacks mentioned above are prevented and the appropriate aberration correction is achieved to the extent of the corner of the screen.

As has been mentioned above, with the use of the projection lens system consisting of eight lens components, it is possible to secure the sufficient field angle and F-number, and in addition, it is possible to obtain the appropriate MTF characteristic from the screen center up to the outer periphery thereof.

Accordingly, it is possible to provide a projection lens system appropriate for use in the high-definition TV, the development of which is now proceeding.

As illustrated in each prescription table, since each projection lens component in accordance with the present invention, can be formed without the use of an expensive glass material having a refraction index of 1.7 or more, it becomes possible to manufacture the projection lens system at low cost.

What is claimed is:

1. A projection lens system for displaying an image formed on a face panel of a cathode ray tube (CRT) on a screen and including a plurality of lens components disposed at an optical axis and arranged in a series, said projection lens system comprising:
    (a) a first lens component disposed at an image end of said series of projection lenses having a positive power, and formed of a meniscus shape having a surface convex to the image;
    (b) a second lens component disposed between said first lens component and said face panel, having a positive power in total, and formed of an overall meniscus shape, having at least one aspheric surface and having a surface convex to the image;
    (c) a third lens component disposed between said second lens component and said face panel, and having a negative power;
    (d) a fourth lens component disposed between said third lens component and said face panel, having a positive power, and formed of a bi-convex shape;
    (e) a fifth lens component disposed between said fourth lens component and said face panel, being brought in contact with a surface of said fourth lens component facing said CRT, and having a negative power;
    (f) a sixth lens component disposed between said fifth lens component and said face panel, having a positive power, and formed of a bi-convex shape;
    (g) a seventh lens component disposed between said sixth lens component and said face plate, having a positive power in total, and formed in an overall meniscus-shape having at least one aspheric surface and a surface concave to the image; and
    (h) an eight lens component disposed between said seventh lens component and said face plate, having a negative power, and formed of a plano-concave shape having a surface concave to the image.

2. A projection lens system according to claim 1, wherein each of said plurality of lens components satisfies the following relationships:

$$0.50 < f/f_1 < 0.60$$

$$-0.65 < f/f_3 < -0.57$$

$$0.55 < f/f_{4+5} < 0.85$$

$$0.50 < f_6 < 0.80$$

$$0.10 < d_{23}/f < 0.20$$

$$0.90 < d_{34}/d_{23} < 1.8$$

wherein f depicts a focal length of the overall projection lens; $f_1$, depicts a focal length of said first lens component; $f_3$, depicts a focal length of said third lens component; $f_{4+5}$, depicts a focal length of a compound lens including said fourth lens component and said fifth lens component; $F_6$, depicts a focal length of said sixth lens component; $d_{23}$, depicts a distance between a lens surface of said second lens component and a lens surface of said third lens component; and $d_{34}$, depicts a distance between a lens surface of said third lens component and a lens surface of said fourth lens component.

3. A projection lens system according to claim 2, wherein each of said lens components consists of a single lens element.

4. A projection lens system according to claim 3, wherein said second lens component and said seventh lens component have aspheric surfaces on both sides.

5. A projection lens system according to claim 4, wherein said second lens component and said seventh lens component are made up of plastic.

6. A projection lens system according to claim 5, wherein a lens surface of said second lens component has no inflection point.

7. A projection lens system according to claim 5, wherein said fifth lens component consists of bi-concave lens.

8. A projection lens system according to claim 7, wherein said third lens component consists of a meniscus lens having a surface convex to the image.

9. A projection lens system according to claim 5, wherein said fifth lens component consists of a meniscus lens having a surface concave to the image.

10. A projection lens system according to claim 9, wherein said third lens component consists of a bi-concave lens.

11. A projection lens system according to claim 9, wherein said third lens component consists of a meniscus lens having a surface convex to the image.

12. A projection lens system according to claim 9, wherein said third lens component consists of a plano-concave lens having a surface planar to the image.

* * * * *

UNITED STATES PATENT AND TRADEMARK OFFICE
CERTIFICATE OF CORRECTION

PATENT NO. : 5,130,850

DATED : July 14, 1992

INVENTOR(S) : Eiichi Toide

It is certified that error appears in the above-identified patent and that said Letters Patent is hereby corrected as shown below:

In claim 2 and formula (4) Col. 14, line 49, and Col. 12, line 57, change "$0.50 < f_6 < 0.80$" to --$0.50 < f/f_6 < 0.80$--

Signed and Sealed this

Twenty-fourth Day of August, 1993

Attest:

BRUCE LEHMAN

*Attesting Officer*  *Commissioner of Patents and Trademarks*